(12) United States Patent
Liu et al.

(10) Patent No.: US 9,143,283 B2
(45) Date of Patent: Sep. 22, 2015

(54) METHOD AND APPARATUS FOR ENHANCING TRANSMISSION OF DOWNLINK ACK/NACK SIGNAL

(71) Applicant: Alcatel Lucent, Boulogne Billancourt (FR)

(72) Inventors: Zheng Liu, Shanghai (CN); Qi Jiang, Shanghai (CN); Jianguo Liu, Shanghai (CN); Gang Shen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/356,928

(22) PCT Filed: Oct. 31, 2012

(86) PCT No.: PCT/IB2012/002424
§ 371 (c)(1),
(2) Date: May 8, 2014

(87) PCT Pub. No.: WO2013/068833
PCT Pub. Date: May 16, 2013

(65) Prior Publication Data
US 2014/0254542 A1 Sep. 11, 2014

(30) Foreign Application Priority Data
Nov. 9, 2011 (CN) .......................... 2011 1 0353357

(51) Int. Cl.
*H04W 4/00* (2009.01)
*H04L 1/18* (2006.01)
(Continued)

(52) U.S. Cl.
CPC ............ *H04L 1/1812* (2013.01); *H04L 1/1671* (2013.01); *H04L 1/1864* (2013.01); *H04L 5/0055* (2013.01); *H04L 1/0025* (2013.01); *H04L 1/1822* (2013.01)

(58) Field of Classification Search
None
See application file for complete search history.

(56) References Cited

FOREIGN PATENT DOCUMENTS

TW 201116123 A1 5/2001
TW 200952431 A1 12/2009
(Continued)

OTHER PUBLICATIONS

3GPP TSG RAN Zhuhai, China, Oct. 10-14, 2011 Source: LG Electronics Title: Discussion on DL/UL control channel for HARQ with ePDCCH.*

(Continued)

*Primary Examiner* — Chi H Pham
*Assistant Examiner* — Fahmida Chowdhury
(74) *Attorney, Agent, or Firm* — Fay Sharpe LLP (57) ABSTRACT

The invention relates to a method and apparatus for enhancing transmission of a downlink ACK/NACK signal in an LTE communication system. In order to attain the object of enhancing transmission of a downlink ACK/NACK signal, the invention proposes an enhanced design of the current PHICH and thus makes an enhanced PHICH (E-PHICH). The enhanced design is focused primarily upon the following aspects: the first aspect is to configure an E-PHICH in the legacy PDSCH and to transmit an ACK/NACK signal in the E-PHICH so that a UE demodulates the E-PHICH to obtain the ACK/NACK signal. The second aspect is to improve a PHICH-and-PUSCH association design by designing an implicit association between an E-PHICH index and a radio frequency resource occupied by a UL grant (in a legacy PDCCH or an E-PDCCH) and an explicit association between a PUSCH scheduled by a UL grant and an E-PDCCH respectively and to transmit an ACK/NACK signal in the E-PHICH so that a UE demodulates the E-PHICH to obtain the ACK/NACK signal. With the invention, transmission of a downlink ACK/NACK signal in an LTE communication system can be enhanced.

15 Claims, 5 Drawing Sheets

(51) Int. Cl.
  *H04L 5/00*   (2006.01)
  *H04L 1/16*   (2006.01)
  *H04L 1/00*   (2006.01)

(56) References Cited

FOREIGN PATENT DOCUMENTS

| TW | 201119463 A1 | 6/2011 |
| TW | 201135241 A1 | 10/2011 |

OTHER PUBLICATIONS

LG Electronics, "Discussion on DL/UL control channel for HARQ with ePDCCH," 3$^{rd}$ Generation Partnership Project (3GPP), 3GPP TSG RAN WG1 Meeting #66 bis, R1-113197, pp. 1-4, XP050538319, Zhuhai, China, Oct. 10-14, 2011.

Alcatel-Lucent Shanghai Bell et al., "PHICH Enhancements," 3$^{rd}$ Generation Partnership Project (3GPP), 3GPP TSG RAN WG1 Meeting #67, R1-114067, pp. 1-3, XP050562402, San Francisco, USA, Nov. 14-18, 2011.

SHARP, "Motivations and scenarios for enhanced downlink control channel investigation," 3$^{rd}$ Generation Partnership Project (3GPP), 3GPP TSG RAN WG1 Meeting #66bis, R1-113351, pp. 1-5, XP050538421, Zhuhai, China, Oct. 10-14, 2011.

LG Electronics, "PHICH linkage to uplink transmissions," 3$^{rd}$ Generation Partnership Project (3GPP), 3GPP TSG RAN WG1#52, R1-080999, pp. 1-4, XP050109467, Sorrento, Italy, Feb. 11-15, 2008.

* cited by examiner

METHOD AND APPARATUS FOR ENHANCING TRANSMISSION OF DOWNLINK ACK/NACK SIGNAL

FIELD OF THE INVENTION

The present disclosure relates to a method and apparatus for enhancing transmission of a downlink ACK/NACK signal and particularly to a method and apparatus for enhancing transmission of a downlink ACK/NACK signal in an LTE communication system.

BACKGROUND OF THE INVENTION

The Hybrid Automatic Repeated Request (HARQ) mechanism plays a critical role in ensuring accurate reception of a transmission signal in an LTE communication system, and a User Equipment (UE) may receive an acknowledgement (ACK) signal and a negative acknowledgement (NACK) signal in an HARP procedure, where new data transmission is performed if an ACK signal is received, and data retransmission is performed if an NACK signal is received. In the current 3GPP LTE system, there are generally two ways to signal an ACK/NACK (also abbreviated as an A/N) to a UE: one is to use a Physical Hybrid-ARQ Indicator Channel (PHICH), and the other is to use a New Data Indicator (NDI) signal in a Physical Downlink Control Channel (PDCCH). Although a UE can always use an NDI in a Downlink Control Indicator (DCI) to recognize an A/N signal, the overhead of an uplink (UL) grant upon each transmission can not be negligible. In contrast, an A/N signal can be transmitted to a UE over the PHICH at a much lower overhead.

There are a greatly increased capacity of Physical Uplink Shared Channels (PUSCHs) and also a larger number of N/A signals over the PHICH in a Multi-User Multi-Input Multi-Output (MU-MIMO) scenario and a scenario of Coordinated Multi-Point (CoMP) with a shared cell ID. Particularly the greatly increased number of PUSCHs sharing the same radio frequency resource may incur a conflicting PHICH resource determined jointly by a starting Physical Resource Block (PRB) index of a PUSCH and a configured cyclic shift of a user-specific reference signal (DM-RS) according to a current PUSCH-and-PHICH association rule. This kind of collision may possibly cause mis-detection of an A/N signal by a UE.

The current PHICH has also become a bottleneck in a heterogeneous network particularly when Cell Range Expansion (CRE) is used. In this case, the PHICH will either suffer from more interference of another cell or cells or be blanked out in an Almost Blank Sub-frame (ABS). Thus there may be a greatly increased error probability of a transmitted A/N signal, and even an A/N feedback may be unavailable for some PUSCH transmission.

SUMMARY OF THE INVENTION

The invention proposes a solution to address the foregoing problems, that is, a method and apparatus for enhancing transmission of a downlink ACK/NACK signal in an LTE communication system.

The invention proposes an enhanced design of the current PHICH and thus makes an enhanced PHICH (E-PHICH). The E-PHICH can avoid occurrence of collision in the CoMP scenario 4. The E-PHICH can alleviate interference in a heterogeneous network. The enhanced design is focused primarily upon the following aspects:

The first aspect is to configure an E-PHICH in the legacy PDSCH. This design can support beam forming and an adaptive Modulation and Coding Scheme (MCS) to provide larger flexibility and higher transmission efficiency. The E-PHICH can be located in the legacy PDSCH region and demodulated based upon a DM-RS signal instead of a CRS signal. Considering a limited size of a single E-PHICH, an Orthogonal Cover Code (OCC), e.g., a Walsh code, can be used to multiplex a plurality of E-PHICHs or to mitigate interference among a plurality of users. In order to support beam-forming, an adaptive MCS and an OCC, specific configuration information shall be signaled to a UE to decode an E-PHICH. The specific configuration information includes at least one of: user allocation information for multi-user multiplexing in the E-PHICH, MCS allocation information for the E-PHICH, rank allocation information for a pre-coding matrix and user OCC allocation information, and the E-PHICH is demodulated based upon the received specific configuration information to obtain an A/N signal.

The second aspect is focused upon an improved PHICH-and-PUSCH association design to avoid A/N collision. Since the current PHICH resource association rule may cause A/N collision, the invention proposes two new association designs to address this problem:

The first design is to associate an index of an E-PHICH implicitly with a radio frequency resource occupied by a UL grant (either in the legacy PDCCH or in an E-PDCCH).

The second design is to have a DCI of a UL grant include an explicit indication of an E-PHICH resource corresponding to a PUSCH scheduled by this UL grant.

According to a first aspect of the invention, there is provided a method, in a base station, of enhancing transmission of a downlink ACK/NACK signal, the method comprising the steps of:

a. configuring an enhanced physical Hybrid-ARQ indicator channel in a physical downlink shared channel; and
b. transmitting an ACK/NACK signal in the enhanced physical Hybrid-ARQ indicator channel.

Correspondingly according to a second aspect of the invention, there is provided a method, in a user equipment, of enhancing transmission of a downlink ACK/NACK signal, the method comprising the step of:

B. demodulating an enhanced physical Hybrid-ARQ indicator channel to obtain an ACK/NACK signal, wherein the enhanced physical Hybrid-ARQ indicator channel is configured in a physical downlink shared channel.

According to a preferred embodiment, the enhanced physical Hybrid-ARQ indicator channel is demodulated using DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further comprises the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the methods of the invention, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

According to a third aspect of the invention, there is provided a method, in a base station, of enhancing transmission of a downlink ACK/NACK signal, the method comprising the steps of:
  a. associating an enhanced physical Hybrid-ARQ indicator channel with a physical uplink shared channel, the association between the two channels satisfying the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation; and
  b. transmitting an ACK/NACK signal in the enhanced physical Hybrid-ARQ indicator channel.

Correspondingly according to a fourth aspect of the invention, there is provided a method, in a user equipment, of enhancing transmission of a downlink ACK/NACK signal, the method comprising the steps of:
  A. demodulating an enhanced physical Hybrid-ARQ indicator channel to obtain an ACK/NACK signal, wherein the enhanced physical Hybrid-ARQ indicator channel is associated with a physical uplink shared channel, and the association between the two channels satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

According to a preferred embodiment, the enhanced physical Hybrid-ARQ indicator channel is demodulated using DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further comprises the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the method of the inventions, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

According to a fifth aspect of the invention, there is provided a method, in a base station, of enhancing transmission of a downlink ACK/NACK signal, the method comprising the steps of:
  a. transmitting new downlink control information in a physical downlink control channel, the new downlink control information including an index of an enhanced physical Hybrid-ARQ indicator channel corresponding to a scheduled physical uplink shared channel; and
  b. transmitting an ACK/NACK signal in the enhanced physical Hybrid-ARQ indicator channel.

According to a preferred embodiment, the new downlink control information further includes configuration information for configuring the enhanced physical Hybrid-ARQ indicator channel, the configuration information including at least one of: modulation and coding information, rank allocation information for a pre-coding matrix, user configuration information and orthogonal cover code configuration information. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

Correspondingly according to a sixth aspect of the invention, there is provided a method, in a user equipment, of enhancing transmission of a downlink ACK/NACK signal, the method comprising the steps of:
  B. receiving new downlink control information, the new downlink control information including an index of an enhanced physical Hybrid-ARQ indicator channel corresponding to a scheduled physical uplink shared channel; and
  C. demodulating the enhanced physical Hybrid-ARQ indicator channel to obtain an ACK/NACK signal.

According to a preferred embodiment, the enhanced physical Hybrid-ARQ indicator channel is demodulated using DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further comprises the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the methods of invention, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

Corresponding to the foregoing methods of invention, the invention further provides apparatuses corresponding thereto.

According to a seventh aspect of the invention, there is provided an apparatus, in a base station, for enhancing transmission of a downlink ACK/NACK signal, the apparatus comprising:
 a configuring device configured to configure an enhanced physical Hybrid-ARQ indicator channel in a physical downlink shared channel; and
 a transmitting device configured to transmit an ACK/NACK signal in the enhanced physical Hybrid-ARQ indicator channel.

Correspondingly according to an eighth aspect of the invention, there is provided an apparatus, in a user equipment, for enhancing transmission of a downlink ACK/NACK signal, the apparatus including:
 a demodulating device configured to demodulate an enhanced physical Hybrid-ARQ indicator channel to obtain an ACK/NACK signal, wherein the enhanced physical Hybrid-ARQ indicator channel is configured in a physical downlink shared channel.

According to a ninth aspect of the invention, there is provided an apparatus, in a base station, for enhancing transmission of a downlink ACK/NACK signal, the apparatus comprising:
 an associating device configured to associate an enhanced physical Hybrid-ARQ indicator channel with a physical uplink shared channel, the association between the two channels satisfying the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\_PHICH}$ is a total number of the enhanced physical Hybrid-ARQ indicator channel configured by a high-layer signaling, and mod is a modulo operation; and
 a transmitting device configured to transmit an ACK/NACK signal in the enhanced physical Hybrid-ARQ indicator channel.

Correspondingly according to a tenth aspect of the invention, there is provided an apparatus, in a user equipment, for enhancing transmission of a downlink acknowledgement/negative acknowledgement signal, the apparatus comprising:
 a demodulating device configured to demodulate an enhanced physical Hybrid-ARQ indicator channel to obtain an ACK/NACK signal, wherein the enhanced physical Hybrid-ARQ indicator channel is associated with a physical uplink shared channel, and the association between the two channels satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\_PHICH}$ is a total number of the enhanced physical Hybrid-ARQ indicator channel configured by a high-layer signaling, and mod is a modulo operation.

According to an eleventh aspect of the invention, there is provided an apparatus, in a base station, for enhancing transmission of a downlink ACK/NACK signal, the apparatus comprising:
 a first transmitting device configured to transmit new downlink control information in a physical downlink control channel, the new downlink control information including an index of an enhanced physical Hybrid-ARQ indicator channel corresponding to a scheduled physical uplink shared channel; and
 a second transmitting device configured to transmit an ACK/NACK signal in the enhanced physical Hybrid-ARQ indicator channel.

Correspondingly according to a twelfth aspect of the invention, there is provided an apparatus, in a user equipment, for enhancing transmission of a downlink ACK/NACK signal, the apparatus comprising:
 a receiving device configured to receive new downlink control information, the new downlink control information including an index of an enhanced physical Hybrid-ARQ indicator channel corresponding to a scheduled physical uplink shared channel; and
 a demodulating device configured to demodulate the enhanced physical Hybrid-ARQ indicator channel to obtain an ACK/NACK signal.

BRIEF DESCRIPTION OF DRAWINGS

The foregoing and other features of the invention will become more apparent from the following detailed description of embodiments taken in conjunction with the drawings throughout which like numeral references denote like or similar components and in which:

FIG. 6 illustrates a schematic diagram of an explicit association between an E-PHICH and a PUSCH according to the third embodiment of the invention, where FIG. 6(a) relates to an FDD scenario, and FIG. 6(b) relates to a TDD scenario.

DETAILED DESCRIPTION OF EMBODIMENTS

The invention proposes an enhanced design of the current PHICH and thus makes an enhanced PHICH (E-PHICH). The E-PHICH can avoid occurrence of collision in the CoMP scenario 4. The E-PHICH can alleviate interference in a heterogeneous network. The enhanced design is focused primarily upon the following aspects:

The first aspect is to configure an E-PHICH in the legacy PDSCH. This design can support beam forming and an adaptive Modulation and Coding Scheme (MCS) to provide larger flexibility and higher transmission efficiency. The E-PHICH can be located in the legacy PDSCH region and demodulated based upon a DM-RS signal instead of a CRS signal. Considering a limited size of a single E-PHICH, an Orthogonal Cover Code (OCC), e.g., a Walsh code, can be used to multiplex a plurality of E-PHICHs or to mitigate interference among a plurality of users. In order to support beam-forming, an adaptive MCS and an OCC, specific configuration information shall be signaled to a UE to decode an E-PHICH. The specific configuration information includes at least one of: user allocation information for multi-user multiplexing in the E-PHICH, MCS allocation information for the E-PHICH, rank allocation information for a pre-coding matrix and user OCC allocation information, and the E-PHICH is demodulated based upon the received specific configuration information to obtain an A/N signal.

The second aspect is focused upon an improved PHICH-and-PUSCH association design to avoid A/N collision. Since the current PHICH resource association rule may cause A/N collision, the invention proposes two new association designs to address this problem:

The first design is to associate an index of an E-PHICH implicitly with a radio frequency resource occupied by a UL grant (either in the legacy PDCCH or in an E-PDCCH).

The second design is to have a DCI of a UL grant include an explicit indication of an E-PHICH resource corresponding to a PUSCH scheduled by this UL grant.

Embodiments in which the invention is embodied will be described below in details.

First Embodiment

Figure 1:
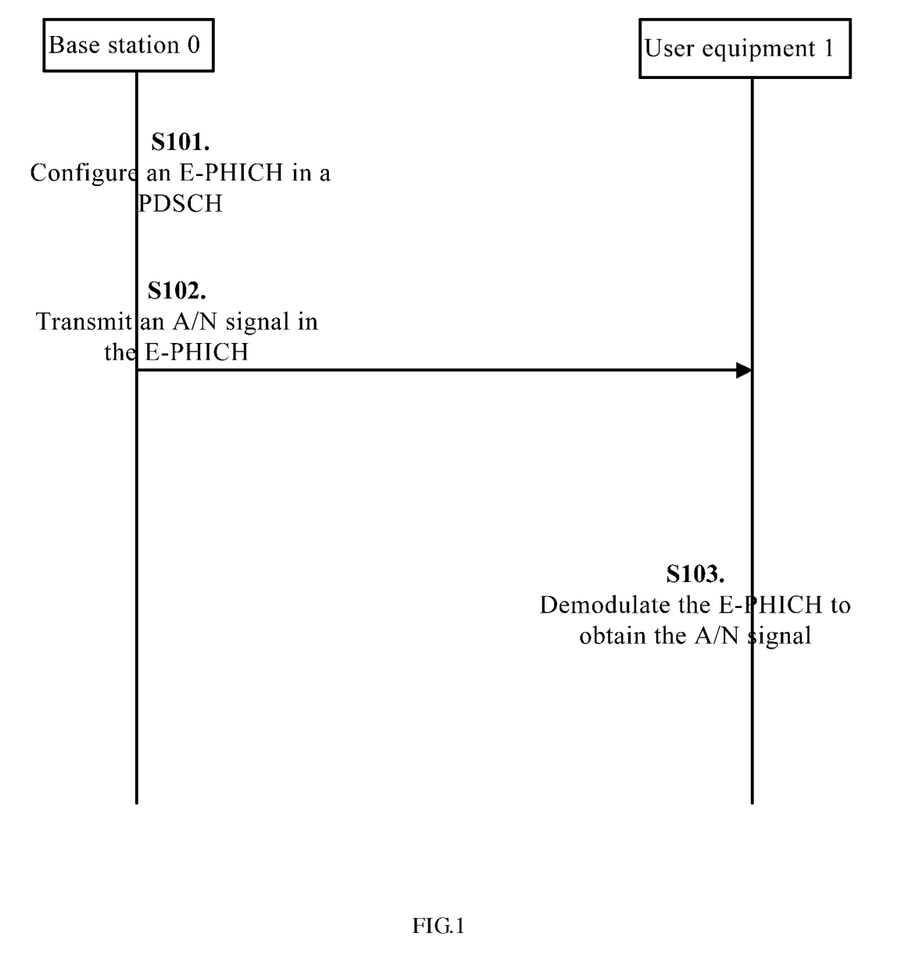
FIG. 1 illustrates a flow chart of a method of enhancing transmission of a downlink ACK/NACK signal according to a first embodiment of the invention.

FIG. 1 illustrates a flow chart of a method of enhancing transmission of a downlink ACK/NACK signal according to a first embodiment of the invention, and the method includes the steps of:

S101: An enhanced physical Hybrid-ARQ indicator channel is configured in a physical downlink shared channel;

S102: An ACK/NACK signal is transmitted in the enhanced physical Hybrid-ARQ indicator channel; and S103: A UE demodulates the enhanced physical Hybrid-ARQ indicator channel to obtain the ACK/NACK signal.

Figure 4:
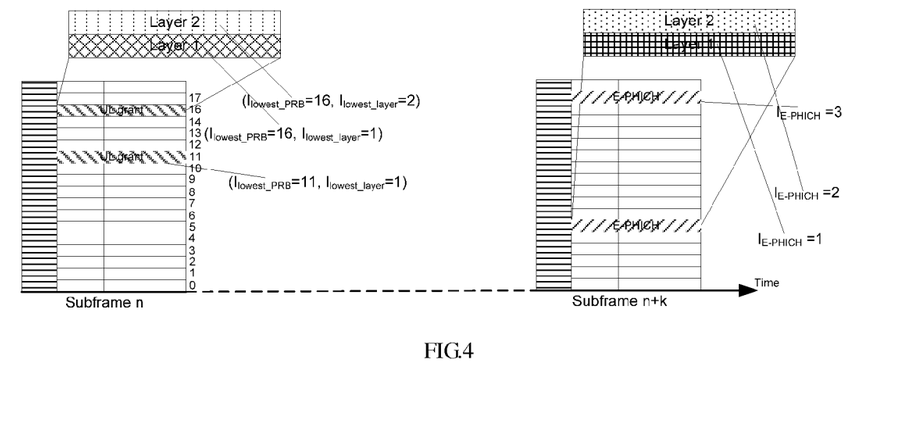
FIG. 4 illustrates a schematic diagram according to the first embodiment of the invention

FIG. 4 illustrates a schematic diagram according to the first embodiment of the invention. In this embodiment, the E-PHICH is located in the traditional PDSCH region and demodulated based upon a DM-RS. The E-PHICH can support gains of beam shaping and an adaptive MCS. Considering an effective code rate, beam-forming, adaptive MCS and an OCC are used, and one PRB pair or even one PRB may be too wasteful for E-PHICH transmission, and thus an E-PHICH and an E-PDCCH or a plurality of E-PHICHs can be multiplexed in one PRB or several PRB pairs.

According to a preferred embodiment, the enhanced physical Hybrid-ARQ indicator channel is demodulated using a DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further includes the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the methods of the invention, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

Second Embodiment

Figure 2:
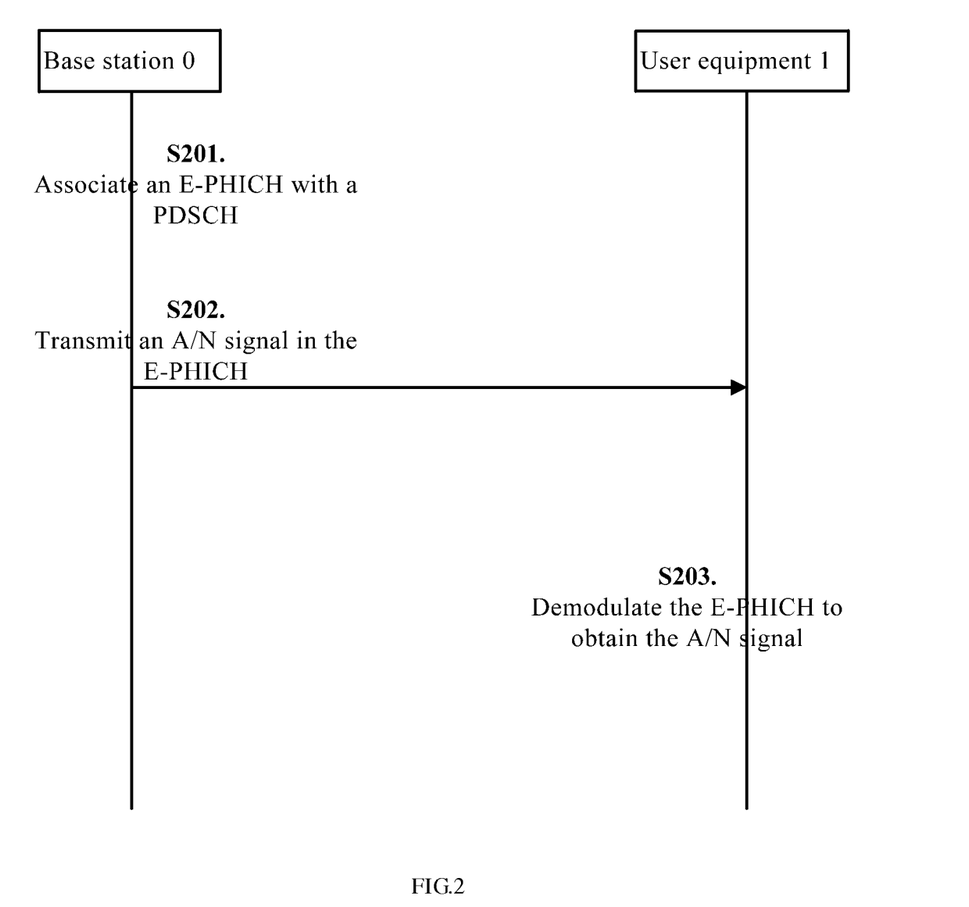
FIG. 2 illustrates a flow chart of a method of enhancing transmission of a downlink ACK/NACK signal according to a second embodiment of the invention.

FIG. 2 illustrates a flow chart of a method of enhancing transmission of a downlink ACK/NACK signal according to a second embodiment of the invention, and the method includes the steps of:

S201: An enhanced physical Hybrid-ARQ indicator channel is associated with a physical uplink shared channel, the association between the two channels satisfying the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\_PHICH}$ is the total number of the enhanced physical Hybrid-ARQ indicator channel configured by a high-layer signaling, and mod is a modulo operation;

S202: An ACK/NACK signal is transmitted in the enhanced physical Hybrid-ARQ indicator channel; and S203: A UE demodulates the enhanced physical Hybrid-ARQ indicator channel to obtain the ACK/NACK signal.

Figure 5:
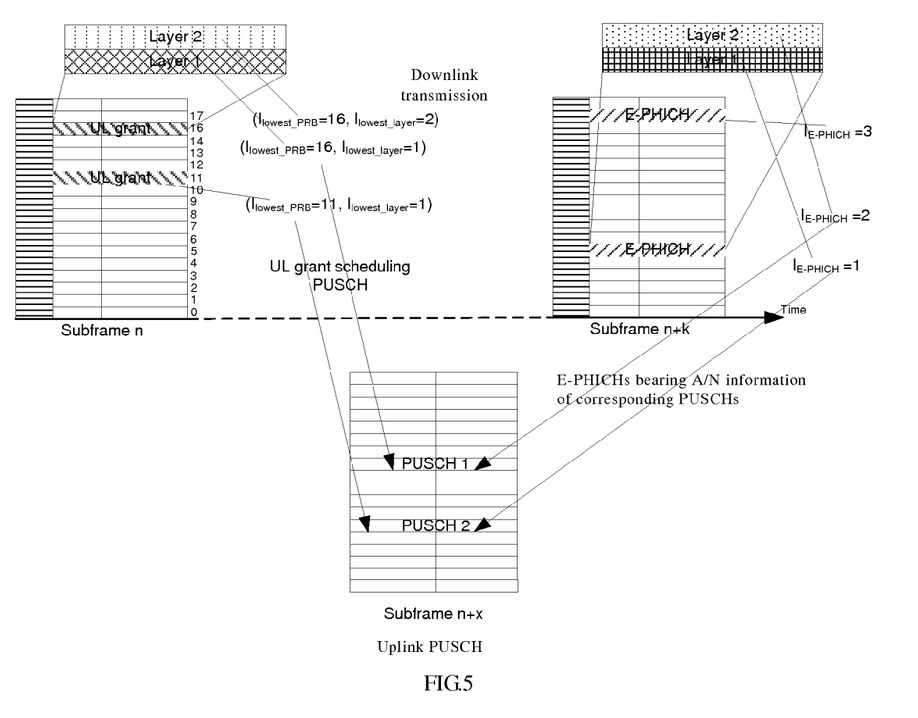
FIG. 5 illustrates a schematic diagram of an implicit association between an E-PHICH and a UL grant according to the second embodiment of the invention.

FIG. 5 illustrates a schematic diagram of an implicit association between an E-PHICH and a UL grant according to the second embodiment of the invention. In the figure, a PDCCH (i.e., a UL grant) indexed with $I_{lowest\_PRB}=11$, $I_{lowest\_layer}=1$ schedules resources for use by a PUSCH2, and acknowledgement information (ACK/NACK) of the PUSCH2 is borne over resources of an E-PHICH indexed with $I_{E\text{-}PHICH}=1$. Since there is one-to-one correspondence between the UL grant and the PUSCH, the PUSCH corresponding to the specific E-PHICH can be indexed out for transmission as long as the association between the UL grant and the E-PHICH is established. The association between the UL grant and the E-PHICH can be established in the equation of $I_{E\text{-}PHICH} = (I_{lowest\_PRB} + I_{lowest\_layer}) \bmod N_{E\text{-}PHICH}$. This equation ranks both the resource occupied by the UL grant and the resource occupied by the E-PHICH in an ascending order and then makes them correspond to each other at both sides. Due to the one-to-one correspondence between the UL grant and the PUSCH, the UE can know it during scheduling, and thus the UE can also have the E-PHICH and the PUSCH in one-to-one correspondence.

According to a preferred embodiment, the enhanced physical Hybrid-ARQ indicator channel is demodulated using a DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further includes the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the methods of the invention, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

Third Embodiment

Figure 3:
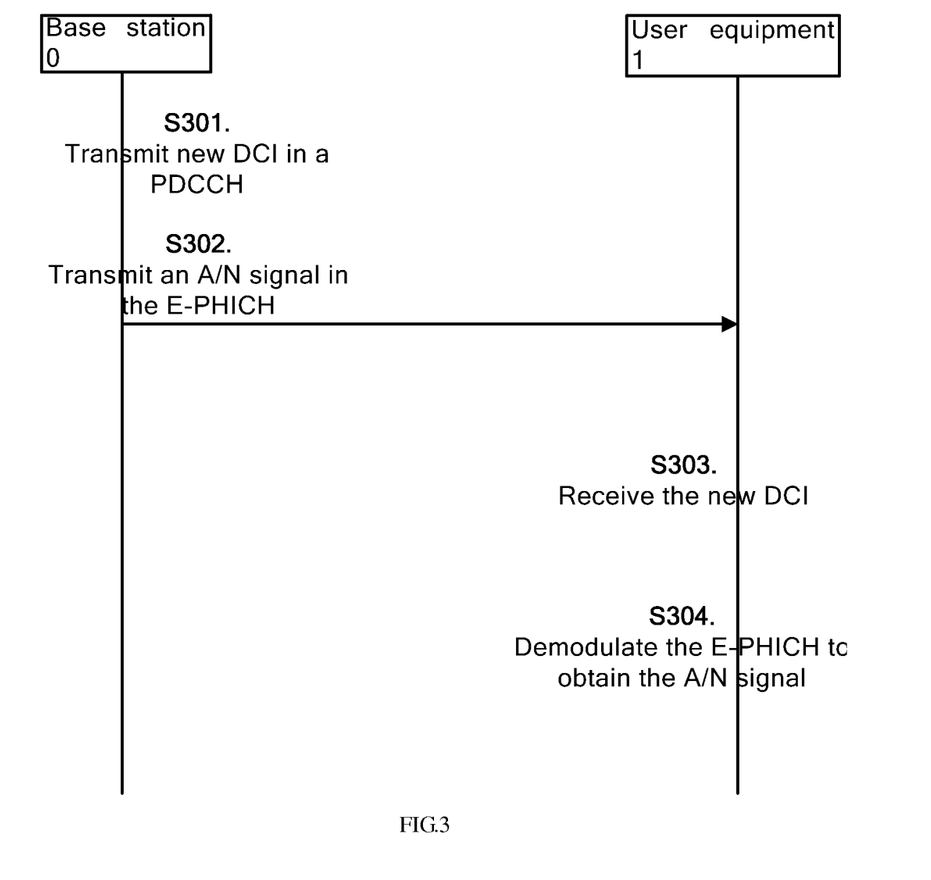
FIG. 3 illustrates a flow chart of a method of enhancing transmission of a downlink ACK/NACK signal according to a third embodiment of the invention.

Although the foregoing implicit association scheme can save a signaling overhead of an E-PHICH, confliction of an A/N signal may not be avoided completely. Particularly in view of UL retransmission to be synchronized, a new UL grant may occupy the same radio frequency resource, the same spatial layer and even the same OCC as a UL grant scheduling retransmission of previous PUSCH transmission. In this case, an A/N feedback of a new PUSCH may collide with retransmission. Thus the invention further proposes an explicit scheme in addition to the implicit association scheme FIG. 3 illustrates a flow chart of a method of enhancing transmission of a downlink ACK/NACK signal according to a third embodiment of the invention, and the method includes the steps of:

S301: New downlink control information is transmitted in a physical downlink control channel, the new downlink control information including an index of an enhanced physical Hybrid-ARQ indicator channel corresponding to a scheduled physical uplink shared channel;

S302: An ACK/NACK signal is transmitted in the enhanced physical Hybrid-ARQ indicator channel;

S303: A UE receives the new downlink control information, the new downlink control information including the index of the enhanced physical Hybrid-ARQ indicator channel corresponding to the scheduled physical uplink shared channel; and S304: The UE demodulates the enhanced physical Hybrid-ARQ indicator channel to obtain the ACK/NACK signal.

The invention designs a new DCI format for a UL grant in order to indicate an association between a PUSCH and an index of an E-PHICH resource. The new DCI includes UL scheduling information and an indicator of an E-PHICH resource associated with a scheduled PUSCH. This explicit association design can be apparent in FIG. 6.

Figure 6A:
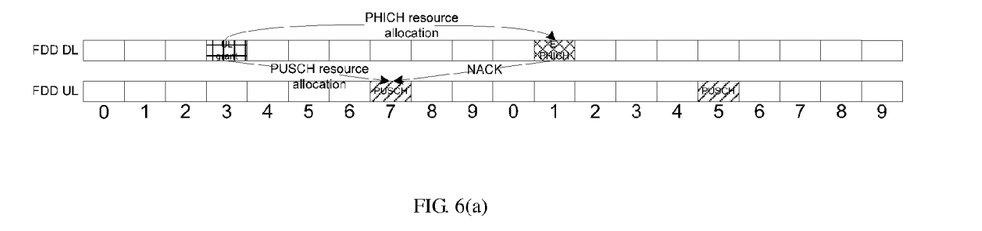
Figure 6B:
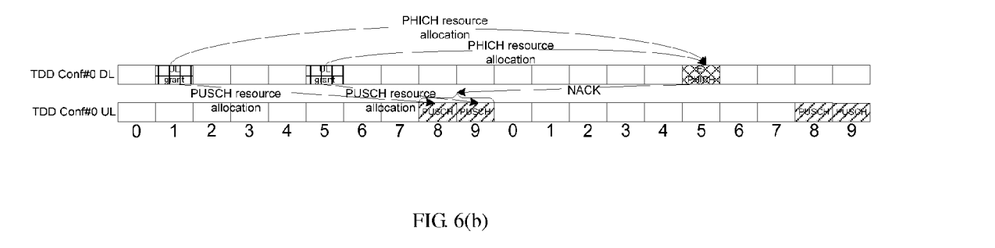

FIG. 6 illustrates a schematic diagram of an explicit association between an E-PHICH and a PUSCH according to the third embodiment of the invention. The figure shows an example of a timing diagram of an HARQ in the configuration 0 (the Conf#0) of Frequency Division Duplex (FDD) and Time Division Duplex (TDD), where FIG. 6(a) relates to an FDD scenario, and FIG. 6(b) relates to a TDD scenario.

In an LTE system, scheduling of uplink transmission (a PUSCH), i.e., a UL grant shall be transmitted to a UE in several sub-frames prior to transmission of the PUSCH for the purpose of reserving a sufficient period for the UE to prepare for data to be transmitted. This delay is fixed to 4 ms for an FDD system and configured differently for a TDD system dependent upon a different uplink and downlink sub-frame configuration (i.e., the Conf# in the figure) and thus will be fixed given a known Conf#. Alike a delay is also present between acknowledgment information of PUSCH transmission and PUSCH transmission and also 4 ms for FDD and determined for TDD by the Conf#. As illustrated in FIG. 6, for FDD, a UL grant of the DL sub-frame 3 schedules a PUSCH of the UL sub-frame 7, and an E-PHICH of the DL sub-frame 1 is used to make an acknowledgement for the PUSCH of the UL sub-frame 7, and the PUSCH is retransmitted in the next UL sub-frame 5 if the acknowledgement is an NACK. An explicit association design scheme is to indicate a used E-PHICH resource (i.e., a sequence number of an E-PHICH) directly in a UL grant scheduling for a PUSCH. As illustrated in FIG. 6 for FDD, the UL grant indicates scheduling information of the PUSCH and an index of the E-PHICH corresponding to the PUSCH to the UE. This scheme applies similarly to TDD except that it may be slightly complicated because the timing relationship varies with the Conf# and also ACK/NACK information for PUSCHs of a plurality of UL sub-frames may have to be transmitted over an E-PHICH of a sub-frame without departing from the scope of the invention.

After the UE decodes its dedicated UL grant DCI, it can obtain its PUSCH scheduling information and also the resource index allocated for the E-PHICH associated with the PUSCH. Thus with this scheme, each E-PHICH can be exclusively associated with corresponding PUSCH transmission.

The E-PHICH configuration information described above can be incorporated into the new UL grant DCI. In general, the new DCI format generally includes the following three types of information: UL PUSCH scheduling information similar to a current UL DCI format; E-PHICH configuration information including modulation and coding information and/or rank allocation information for a pre-coding matrix and/or user configuration information and/or orthogonal cover code configuration information; and resource allocation information of an enhanced physical Hybrid-ARQ indicator channel corresponding to a scheduled physical uplink shared channel.

According to a preferred embodiment, the new downlink control information further includes configuration information for configuring the enhanced physical Hybrid-ARQ indicator channel, the configuration information including at least one of: modulation and coding information, rank allocation information for a pre-coding matrix, user configuration information and orthogonal cover code configuration information. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

According to a preferred embodiment, the enhanced physical Hybrid-ARQ indicator channel is demodulated using a DM-RS. An advantage of this embodiment lies in that frequency-domain interference cancellation (ICIC) can be supported, gains of beam-forming can be obtained and resources can be allocated flexibly at this time.

According to a preferred embodiment, before the UE demodulates the E-PHCIH, the method further includes the steps of: receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a pre-coding matrix and orthogonal cover code allocation information for users; and demodulating the enhanced physical Hybrid-ARQ indicator channel based on the received specific configuration information to obtain the ACK/NACK signal. An advantage of this embodiment lies in that the DM-RS is used as information necessary for demodulating the E-PHICH so that demodulation of the E-PHICH by the UE based upon the DM-RS can be supported to achieve the foregoing advantageous effects achievable due to demodulation of the E-PHICH based upon the DM-RS.

With the methods of invention, transmission of the downlink A/N signal can be enhanced at a lowered transmission error ratio, and in different application scenarios, frequency-domain interference cancellation (ICIC) can be supported, and gains of beam-forming, e.g., improved transmission efficiency, an extended coverage area, etc., can be obtained.

Although the foregoing text has set forth the detailed description of the various embodiments of the invention, the legal scope of the invention shall be defined literally in the claims appended to the invention. The detailed description shall be construed as demonstrating but not limiting each possible embodiment of the invention because it may be impractical, even if possible, to describe each possible embodiment. Various alternative embodiments can be possible with existing technologies or technologies to be developed subsequent to the filing date of the present patent application and shall still fall into the scope of the claims by which the invention is defined.

The invention claimed is:

1. A method, in a base station, of enhancing transmission of a downlink ACK/NACK signal, the method comprising:
configuring an enhanced physical Hybrid-ARQ indicator channel in a physical downlink shared channel; and
transmitting an ACK/NACK signal in the enhanced physical Hybrid-ARQ indicator channel;
wherein an association between the enhanced physical Hybrid-ARQ indicator channel and the physical downlink shared channel satisfies the equation of:

$I_{E\text{-}PHICH} = (I_{lowest\_PRB} + I_{lowest\_layer}) \bmod N_{E\text{-}PHICH}$, wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

2. A method, in a user equipment, of enhancing transmission of a downlink ACK/NACK signal, the method comprising:
demodulating an enhanced physical Hybrid-ARQ indicator channel to obtain an ACK/NACK signal, wherein the enhanced physical Hybrid-ARQ indicator channel is configured in a physical downlink shared channel
wherein an association between the enhanced physical Hybrid-ARQ indicator channel and the physical downlink shared channel satisfies the equation of:

$I_{E\text{-}PHICH} = (I_{lowest\_PRB} + I_{lowest\_layer}) \bmod N_{E\text{-}PHICH}$, wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

3. The method according to claim 2, wherein the enhanced physical Hybrid-ARQ indicator channel is demodulated using a user-specific reference signal.

4. The method according to claim 2, wherein before the demodulating the method further comprises:
receiving specific configuration information, the specific configuration information including at least one of: user allocation information for multi-user multiplexing in the enhanced physical Hybrid-ARQ indicator channel, modulation and coding allocation information for the enhanced physical Hybrid-ARQ indicator channel, rank allocation information for a precoding matrix and orthogonal cover code allocation information for users; and
wherein the demodulating further comprises: demodulating the enhanced physical Hybrid-ARQ indicator channel based on the specific configuration information to obtain the ACK/NACK signal.

5. A method, in a base station, of enhancing transmission of a downlink ACK/NACK signal, the method comprising:
associating an enhanced physical Hybrid-ARQ indicator channel with a physical uplink shared channel, the association between the two channels satisfying the equation of:

$I_{E\text{-}PHICH} = (I_{lowest\_PRB} + I_{lowest\_layer}) \bmod N_{E\text{-}PHICH}$, wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation; and
transmitting an ACK/NACK signal in the enhanced physical Hybrid-ARQ indicator channel.

6. A method, in a user equipment, of enhancing transmission of a downlink ACK/NACK signal, the method comprising:
demodulating an enhanced physical Hybrid-ARQ indicator channel to obtain an ACK/NACK signal, wherein the enhanced physical Hybrid-ARQ indicator channel is associated with a physical uplink shared channel, and the association between the two channels satisfies the equation of:

$I_{E\text{-}PHICH} = (I_{lowest\_PRB} + I_{lowest\_layer}) \bmod N_{E\text{-}PHICH}$, wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

7. A method, in a base station, of enhancing transmission of a downlink ACK/NACK signal, the method comprising:
   transmitting new downlink control information in a physical downlink control channel, the new downlink control information including an index of an enhanced physical Hybrid-ARQ indicator channel associated with a scheduled physical uplink shared channel; and
   transmitting an ACK/NACK signal in the enhanced physical Hybrid-ARQ indicator channel;
   wherein the association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

8. The method according to claim 7, wherein the new downlink control information further includes configuration information for configuring the enhanced physical Hybrid-ARQ indicator channel, the configuration information including at least one of: modulation and coding information, rank allocation information for a precoding matrix, user configuration information and orthogonal cover code configuration information.

9. A method, in a user equipment, of enhancing transmission of a downlink ACK/NACK signal, the method comprising:
   receiving new downlink control information, the new downlink control information including an index of an enhanced physical Hybrid-ARQ indicator channel associated with a scheduled physical uplink shared channel; and
   demodulating the enhanced physical Hybrid-ARQ indicator channel to obtain an ACK/NACK signal;
   wherein the association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

10. An apparatus, in a base station, for enhancing transmission of a downlink ACK/NACK signal, the apparatus comprising:
    a configuring device configured to configure an enhanced physical Hybrid-ARQ indicator channel in a physical downlink shared channel; and
    a transmitting device configured to transmit an ACK/NACK signal in the enhanced physical Hybrid-ARQ indicator channel;
    wherein an association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

11. An apparatus, in a user equipment, for enhancing transmission of a downlink ACK/NACK signal, the apparatus comprising:
    a demodulating device configured to demodulate an enhanced physical Hybrid-ARQ indicator channel to obtain an ACK/NACK signal, wherein the enhanced physical Hybrid-ARQ indicator channel is configured in a physical downlink shared channel;
    wherein an association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

12. An apparatus, in a base station, for enhancing transmission of a downlink ACK/NACK signal, the apparatus comprising:
    an associating device configured to associate an enhanced physical Hybrid-ARQ indicator channel with a physical uplink shared channel, the association between the two channels satisfying the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation; and
    a transmitting device configured to transmit an ACK/NACK signal in the enhanced physical Hybrid-ARQ indicator channel.

13. An apparatus, in a user equipment, for enhancing transmission of a downlink ACK/NACK signal, the apparatus comprising:
    a demodulating device configured to demodulate an enhanced physical Hybrid-ARQ indicator channel to obtain an ACK/NACK signal, wherein the enhanced physical Hybrid-ARQ indicator channel is associated with a physical uplink shared channel, and the association between the two channels satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

14. An apparatus, in a base station, for enhancing transmission of a downlink ACK/NACK signal, the apparatus comprising:
   a first transmitting device configured to transmit new downlink control information in a physical downlink control channel, the new downlink control information including an index of an enhanced physical Hybrid-ARQ indicator channel associated with a scheduled physical uplink shared channel; and
   a second transmitting device configured to transmit an ACK/NACK signal in the enhanced physical Hybrid-ARQ indicator channel;
   wherein the association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

15. An apparatus, in a user equipment, for enhancing transmission of a downlink ACK/NACK signal, the apparatus comprising:
   a receiving device configured to receive new downlink control information, the new downlink control information including an index of an enhanced physical Hybrid-ARQ indicator channel associated with a scheduled physical uplink shared channel; and
   a demodulating device configured to demodulate the enhanced physical Hybrid-ARQ indicator channel to obtain an ACK/NACK signal;
   wherein the association between the enhanced physical Hybrid-ARQ indicator channel and the physical downlink shared channel satisfies the equation of:

$$I_{E\text{-}PHICH} = (I_{lowest\_PRB} + I_{lowest\_layer}) \bmod N_{E\text{-}PHICH},$$

wherein $I_{lowest\_PRB}$ is a lowest index of PRB pairs occupied by an uplink grant, $I_{lowest\_layer}$ is a lowest index of a layer for the uplink grant that is obtained from multi-user allocation information of an enhanced physical downlink control channel, $N_{E\text{-}PHICH}$ is a total number of the enhanced physical Hybrid-ARQ indicator channel configured by a high-layer signaling, and mod is a modulo operation.

* * * * *